US008607240B2

(12) United States Patent
Brandt et al.

(10) Patent No.: US 8,607,240 B2
(45) Date of Patent: *Dec. 10, 2013

(54) INTEGRATION OF DISSIMILAR JOB TYPES INTO AN EARLIEST DEADLINE FIRST (EDF) SCHEDULE

(75) Inventors: Scott A. Brandt, San Jose, CA (US); Richard A. Golding, San Francisco, CA (US); Theodore M Wong, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/594,468

(22) Filed: Aug. 24, 2012

(65) Prior Publication Data

US 2013/0283279 A1 Oct. 24, 2013

Related U.S. Application Data

(63) Continuation of application No. 12/889,263, filed on Sep. 23, 2010.

(51) Int. Cl.
*G06F 9/46* (2006.01)
(52) U.S. Cl.
USPC .......................................... 718/103; 718/104
(58) Field of Classification Search
None
See application file for complete search history.

(56) References Cited

U.S. PATENT DOCUMENTS

| 5,210,872 | A | * | 5/1993 | Ferguson et al. | 718/102 |
|---|---|---|---|---|---|
| 5,278,976 | A | | 1/1994 | Wu | |
| 5,361,362 | A | | 11/1994 | Benkeser et al. | |
| 6,189,022 | B1 | * | 2/2001 | Binns | 718/100 |
| 6,721,789 | B1 | * | 4/2004 | DeMoney | 709/219 |
| 7,093,256 | B2 | * | 8/2006 | Bloks | 718/102 |
| 7,140,022 | B2 | * | 11/2006 | Binns | 718/105 |
| 7,165,252 | B1 | * | 1/2007 | Xu | 718/102 |
| 7,302,685 | B2 | * | 11/2007 | Binns et al. | 718/103 |
| 7,370,326 | B2 | | 5/2008 | Jones et al. | |
| 7,502,912 | B2 | * | 3/2009 | Sodani et al. | 712/214 |
| 7,954,101 | B2 | * | 5/2011 | Adachi et al. | 718/102 |
| 2002/0120661 | A1 | * | 8/2002 | Binns et al. | 709/102 |
| 2002/0120663 | A1 | * | 8/2002 | Binns | 709/103 |
| 2007/0061807 | A1 | | 3/2007 | Bibby | |
| 2007/0074216 | A1 | * | 3/2007 | Adachi et al. | 718/102 |
| 2008/0028415 | A1 | * | 1/2008 | Binns et al. | 718/107 |
| 2008/0235695 | A1 | * | 9/2008 | Itou | 718/103 |
| 2009/0217282 | A1 | | 8/2009 | Raie et al. | |
| 2009/0249351 | A1 | | 10/2009 | Jensen | |

* cited by examiner

*Primary Examiner* — Jennifer To
(74) *Attorney, Agent, or Firm* — Jeffrey T. Holman (57) ABSTRACT

A method for implementation within a scheduler for a processor is described. The method includes receiving a plurality of jobs from an earliest deadline first (EDF) schedule, wherein the scheduler implements an EDF scheduling model. The method also includes receiving a separate job from a source other than the EDF schedule. The separate job has a fixed scheduling requirement with a specific execution time. The method also includes determining an amount of available utilization capacity of the processor and inserting the separate job into an execution plan of the processor with the plurality of jobs from the EDF schedule in response to a determination that the available utilization capacity of the processor is sufficient to execute the separate job according to the fixed scheduling requirement associated with the separate job.

13 Claims, 5 Drawing Sheets

INTEGRATION OF DISSIMILAR JOB TYPES INTO AN EARLIEST DEADLINE FIRST (EDF) SCHEDULE

CROSS-REFERENCE TO RELATED APPLICATIONS

This application is a continuation of U.S. application Ser. No. 12/889,263, filed on Sep. 23, 2010, which is incorporated by reference herein in its entirety.

STATEMENT OF FEDERALLY SPONSORED RESEARCH

This invention was made with Government support under Contract No. HR0011-08-C-0031 awarded by Defense Advanced Research Projects Agency (DARPA). The Government has certain rights in the invention.

BACKGROUND

Many systems, including embedded systems, have real-time timeliness constraints on their processing. Such systems often interact with the real world and/or users and have specific constraints on when they must respond to events, produce results, etc. Some examples of such systems include safety-critical systems such as anti-lock brakes, control systems such as flight control systems, multimedia systems such as video or audio players, and so forth. Systems intended to address such real-time situations must be carefully designed to ensure the timing requirements of the applications they are built to execute.

The CPU scheduler is a core operating system component responsible for managing the execution scheduling of different programs. The CPU scheduler is responsible for determining which program to run at any given time. Where programs have implicit or explicit timeliness constraints or deadlines, the CPU scheduler is primarily responsible for ensuring that the applications execute in time to satisfy the timeliness constraints or deadlines. Many different operating systems and CPU schedulers have been developed to address various sorts of timing requirements.

One type of scheduler that is frequently used in legacy systems (e.g., military and aerospace systems) is based on static schedules. Static schedules are very basic table-driven schedules that include an ordered list of tasks along with a set of times at which those tasks should occur. Upon completion of all of the tasks in the list, the list typically repeats with a fixed frequency, or period. Static schedules are common in legacy systems due in part to their extreme simplicity. However, static schedules are limited in their use because each static schedule is essentially hand-designed to ensure that all work can be completed in the time available. This is feasible only for small task sets.

In contrast to static schedules, other schedulers use dynamic schedules. One type of dynamic schedule is a dynamic priority-based schedule. Priority scheduling (e.g., rate monotonic (RM)) assigns a static priority to each concurrently executing task. Tasks are executed according to their priority, with the highest priority task that is currently executable always selected for execution. A limitation of static priority-based schedules is that in general only a relatively low fraction of the CPU utilization may be guaranteed. Another type of dynamic schedule is a dynamic deadline-based schedule. Deadline scheduling assigns a set of deadlines to each task. In one deadline-based scheduling algorithm known as earliest deadline first (EDF), the system always runs the task with the earliest deadline. An advantage of EDF is that 100% of the CPU utilization may be guaranteed. However, EDF is less frequently used due to concerns about its overhead. Recent research indicates that deadline based schemes are effective in supporting a broad range of types of processes ranging from best-effort to hard real-time.

An advantage of RM and EDF dynamic scheduling schemes is that they allow the concurrent execution of different applications with different timeliness requirements with less hand-integration than a static schedule. In this way, each application can be admitted to the system based on knowledge of the resource availability, without detailed knowledge of the other applications. A potential disadvantage of RM and EDF dynamic scheduling is that they are incapable of supporting legacy processes designed to operate in isolation with static schedulers. This prevents the migration of legacy applications and systems to modern multi-programmed processing platforms. Since legacy applications that use static scheduling are common in aerospace, automotive, and other industries, there are many legacy applications that currently cannot be integrated into modern multi-programmed processing platforms that use dynamic scheduling.

SUMMARY

Embodiments of a method are described. In one embodiment, the method is implemented within a scheduler for a processor. The scheduler implements an earliest deadline first (EDF) scheduling model. An embodiment of the method includes receiving a plurality of jobs for an EDF schedule. The method also includes receiving a separate job with a fixed scheduling requirement with a specific execution time. The method also includes determining an amount of available utilization capacity of the processor. The method also includes inserting the separate job into an execution plan of the processor with the plurality of jobs from the EDF schedule in response to a determination that the available utilization capacity of the processor is sufficient to execute the separate job according to the fixed scheduling requirement associated with the separate job. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments facilitate integrating non-EDF jobs with EDF jobs within an EDF scheduling model. In some embodiments, statically scheduled tasks are executed concurrently with other tasks in a multiprogrammed real-time environment. In other embodiments, short-duration sporadic jobs (which may or may not be part of a static job schedule) are safely executed in a multiprogrammed real-time environment. More specifically, short-duration periodic or aperiodic pieces of code may be executed in a system scheduled with EDF.

As a result of the embodiments described herein, multiprogrammed real-time systems may safely execute legacy code, or other high-priority code such as interrupt service routines, which are designed to execute at specific times. Additionally, the execution of such legacy code can be implemented without causing other real-time and non-real-time processes to violate their timing requirements. This includes jobs implemented via legacy code designed for execution on isolated processors via static schedules. This enables legacy code to execute in modern real-time environments and facilitate graceful transitions from legacy code to modern real-time code designed for multiprogrammed environments. In other embodiments, the executed code is not necessarily legacy code.

As a matter of convenience, the terms "task" and "job" are used interchangeably within this description. These terms are not intended to have specific meanings herein, other than to reference a general amount of executable instructions or code. There is not necessarily any correlation between a task or job and a specific amount of code or typical types of scheduled units such as processes or threads (although some examples may use implementations with processes and/or threads). Additionally, there is no restriction on the type of multiprogramming environment in which tasks or jobs may be executed.

Figure 1:
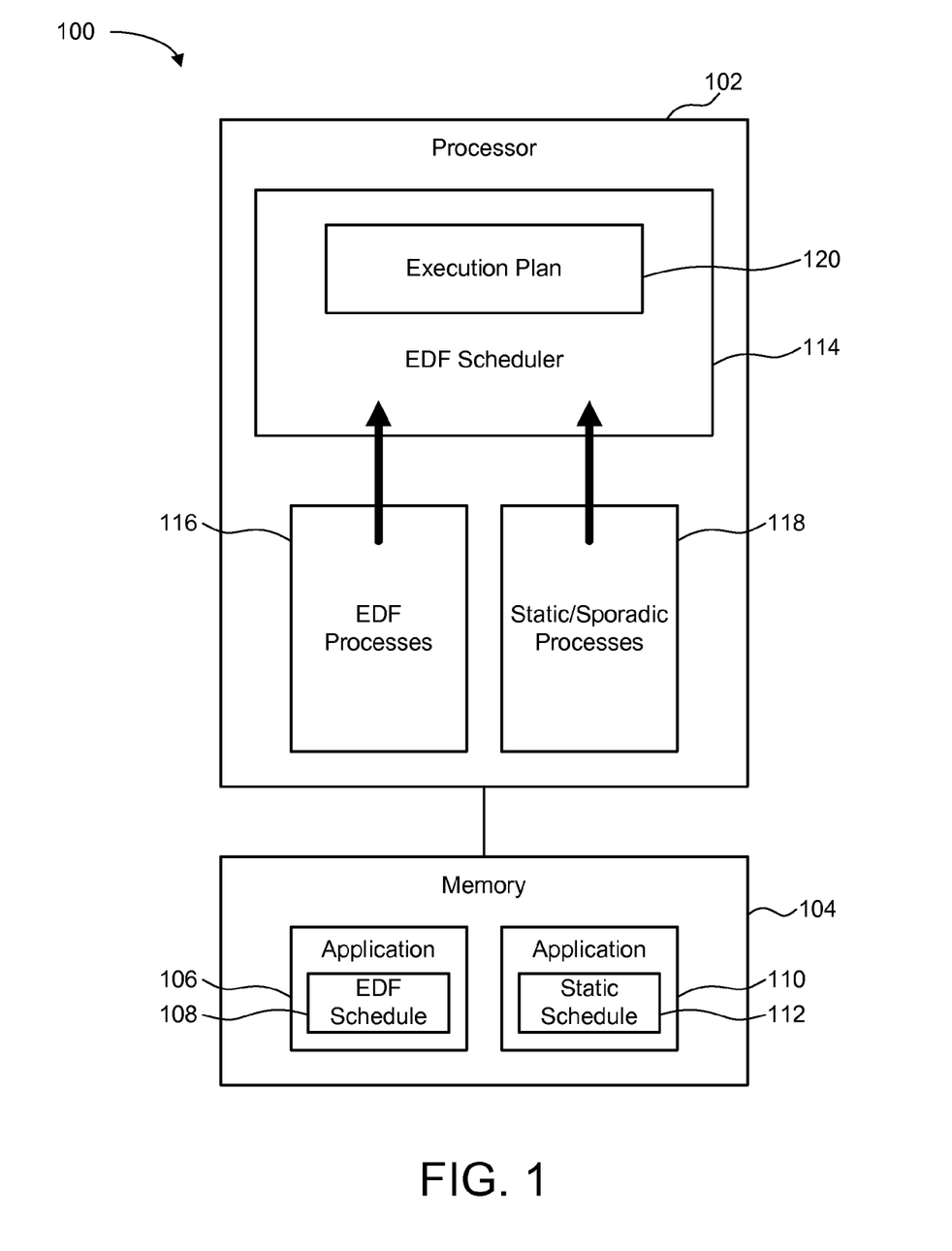
FIG. 1 depicts a schematic block diagram of one embodiment of a computer system for integrating dissimilar job types into an integrated schedule for dynamic scheduling.

FIG. 1 depicts a schematic block diagram of one embodiment of a computer system 100 for integrating dissimilar job types into an integrated schedule for dynamic scheduling. Although the computer system 100 is illustrated with specific component parts which are described with certain functionality, other embodiments of the computer system 100 may include fewer or more component parts capable of implementing more or less functionality.

In the illustrated embodiment, the computer system 100 includes a processor 102 and a memory 104. The processor 102 is representative of any type of processor which executes instructions or program code. Some examples of such processors include, but are not limited to, a central processing unit (CPU), a graphics processing unit (GPU), a microprocessor, a coprocessor, or another similar type of processor. In some embodiments, the illustrated processor 102 is representative of a multi-processor environment in which multiple processors cooperatively execute tasks or jobs in a multi-threaded or other parallel processing approach.

The memory 104 is representative of any type of memory that can store instructions or program code for execution by the processor 102. In some embodiments, the memory 104 is separate from the processor 102, as in the case of main memory or lower levels of cache. In other embodiments, the memory 104 is integrated with the processor 102, as in the case of higher levels of cache that are implemented on the same die as the processor 102.

The depicted memory 104 stores a program application 106 that is designed for execution on the processor 102. The application 106 may be designed to be implemented according to an EDF schedule 108. In this way, the application 106 is designed for implementation so that the task with the earliest deadline is implemented first, at any given time during the execution of the application 106.

The memory 104 also stores another program application 110 that is not natively designed for execution according to an EDF schedule. Rather, this application 110 is designed for execution according to a static schedule 112. In some embodiments, this type of situation occurs when a legacy application 110 from a legacy system (not shown) is loaded into the memory 104 of the computer system 100. The legacy system may have been specially designed to implement the static schedule 112 of the legacy application 110 and, thus, is not inherently compatible with the computer system 100 onto which it is loaded.

The processor 102 includes an EDF scheduler 114 that schedules tasks for processing by the processor 102. Specifically, the EDF scheduler 114 schedules the tasks according to an EDF scheduling model. In a specific embodiment, the EDF scheduler 114 implements a rate-based earliest deadline (RBED) scheduling model. For implementation of the EDF scheduling model, each task has an associated deadline, and the scheduler 114 schedules the tasks so that the tasks with the earliest deadlines are processed before the tasks with later deadlines. Assuming the processor 102 has sufficient resources, the scheduler 114 can satisfy all of the associated deadlines by allocating processor time for execution of specific tasks prior to their corresponding deadlines.

In the illustrated embodiment, the EDF scheduler 114 schedules tasks for both of the applications 106, 110 stored in the memory. Hence, the scheduler 114 schedules EDF processes 116 for the application 106 designed for implementation with the EDF schedule 108. Also, the scheduler 114 schedules static/sporadic processes 118 for the application 110 designed for implementation with the static schedule 112.

In one embodiment, the scheduler 114 takes the tasks (e.g., processes 116, 118) for the applications 106, 108 and creates an execution plan 120 for use by the processor 102. In one embodiment, the scheduler 114 may create and store an actual execution plan 120 prior to execution of the tasks by the processor 102. If the execution plan 120 is stored for later execution, the execution plan 120 may be stored in the memory 104 or on another memory device (e.g., on-board cache) coupled to the scheduler 114. In another embodiment, the scheduler 114 dynamically creates the execution plan 120 so that the execution plan is created by the scheduler 114 at approximately the same time that the tasks are executed by the processor 102.

Figure 2:
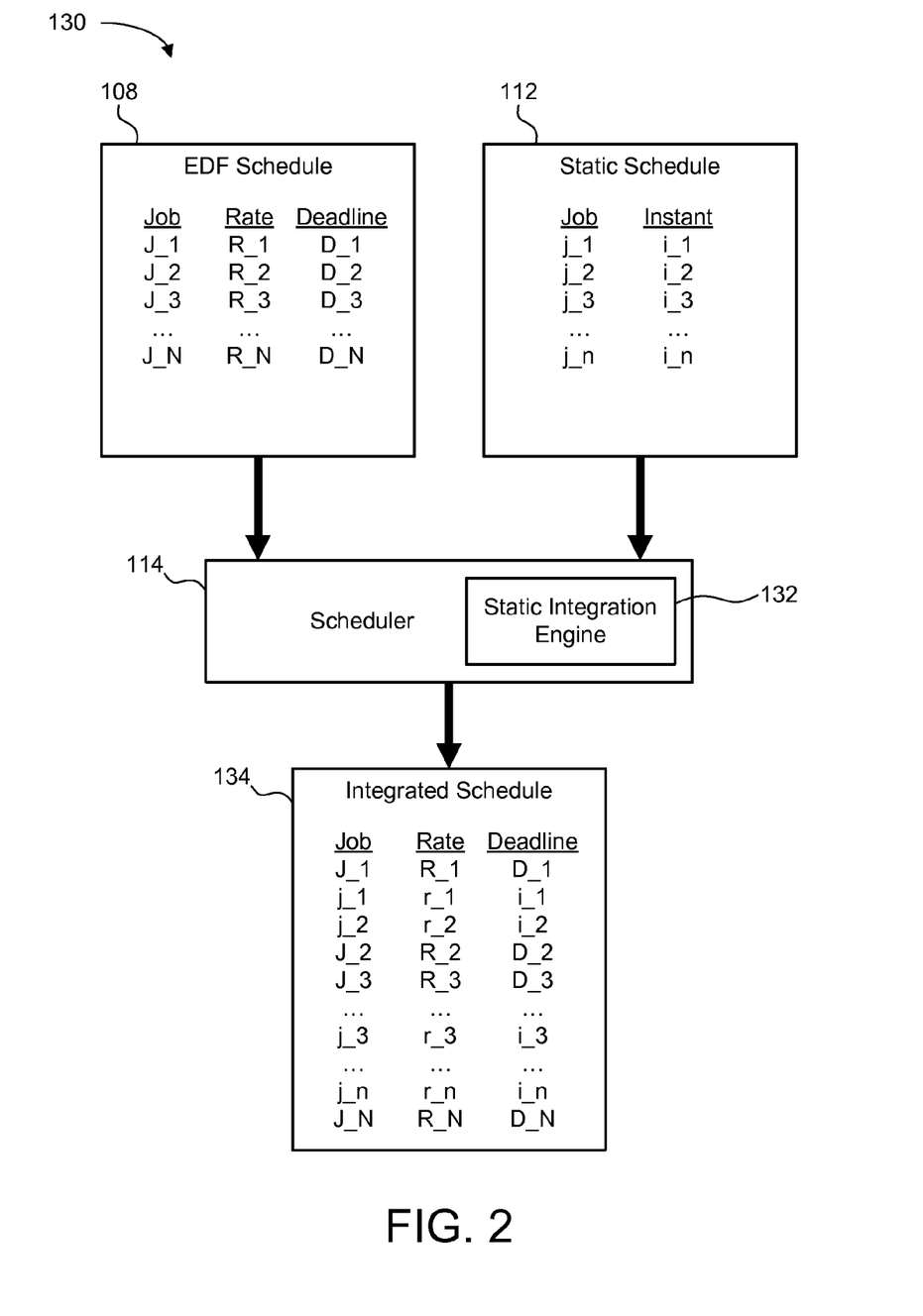
FIG. 2 depicts a schematic diagram of one embodiment of a process for integrating static jobs into an EDF schedule.

FIG. 2 depicts a schematic diagram of one embodiment of a process 130 for integrating static jobs into an EDF schedule. For reference, certain component parts of the computer system 100 are shown in FIG. 2. However, the flow of data and processing operations depicted in FIG. 2 are not necessarily indicative of a specific physical layout or data coupling of such component parts within the computer system 100.

A periodic real-time task commonly includes a unit of work called a job that is repeatedly executed with a frequency equal to 1/p, where p is the period of the task. Thus, a task with a period of 1/10 of a second would execute the job as many as ten times per second. Jobs become ready to run at their release time and must complete by their deadline. A common practice is to make the deadline of the previous job the release time of the next job, and to set the deadline of each job equal to the period of the task. In that scenario, the execution of the task includes a sequence of jobs—one job per period, and each job is ready to run as soon as the previous job's deadline has been reached. Other embodiments may be implemented with other possible configurations that use different release times and/or deadlines.

In the illustrated embodiment, the scheduler 114 includes a static integration engine 132 which uses the EDF schedule 108 and the static schedule 112 to generate an integrated schedule 134. An example of the EDF schedule 108 is shown in table format, including a list of jobs (designated as $J\_1$ through $J\_N$) with associated deadlines ($D\_1$-$D\_N$). The deadline indicates the time at which the job must be completed.

In one embodiment, tasks also may have associated rates ($R\_1$-$R\_N$) that indicate the fraction of the total processor time they will receive between each of their deadlines. To enforce these rates, a timer may be set to interrupt the processing of any job to prevent it from using more than its assigned rate by its assigned deadline. Each task initially has a budget. In one embodiment, the budget is calculated as $B\_i=R\_i*P\_i$, where $R\_i$ is the task's rate, and $P\_i$ is the time between consecutive deadlines of the same task. Other embodiments may use other mathematical operations or algorithms to calculate the budget for a specific task. For example, in some embodiments, that budget may be calculated according to $B\_i=R\_i/P\_i$. Each time a task executes, $B\_i$ is reduced by the amount of time the task executed. When the task is executed, the timer is set to go off $B\_i$ time units in the future. Upon receipt of such an interrupt, the scheduler may set the corresponding task to a state that is not currently executable and proceed to execute the executable task with the highest priority (earliest deadline). If the task will execute again with a new deadline, $B\_i$ may be replenished (e.g., again set to $R\_i*P\_i$) when the previous deadline has been reached.

An example of the static schedule 112 is also shown. The depicted static schedule 112 includes a list of jobs (designated as $j\_1$ through $j\_n$) and corresponding instants ($i\_1$-$i\_n$), which are also referred to as critical instants. In a legacy system, the static schedule 112 would be executed on a dedicated processor that is not running any other jobs or tasks. The critical instants indicate the times by which the corresponding jobs must be completed and, in some embodiments, at which the next job must be started.

Typically, this type of static schedule would be designed for a specific processing environment to ensure that the tasks are executed exactly as indicated in the schedule to satisfy the critical instants. However, in embodiments described herein, the EDF scheduler 114 is capable of integrating the static jobs into a dynamic schedule for implementation on a processor other than the specific processor for which the static schedule was designed.

One example of an integrated schedule 134 is shown in FIG. 2. The integrated schedule 134 includes the jobs from both the EDF schedule 108 and the static schedule 112. In one embodiment, the entire static schedule 112 is treated as a non-periodic real-time task, and the critical instants of the static jobs are used as the deadlines of the jobs in the task in the integrated schedule 134. When all of the jobs in the static schedule 112 have completed, the entire set of jobs may be repeated, similar to the way that individual jobs in a periodic task are repeated.

In one embodiment, the scheduler 114 also generates a new rate (designated as r_S) corresponding to the task containing the static jobs. In one embodiment, some or all of the static jobs are combined into a single task with a rate r_S that is a summation of individual rates ($r\_1$ through $r\_n$) that would otherwise be associated with the individual static jobs. An example of how to generate this rate is described in more detail below. However, embodiments of the scheduler 114 may use various methods for generating and assigning rates to the static jobs within the integrated schedule 134.

In one embodiment, the scheduler 114 is an RBED integrated real-time scheduler which supports a variety of different types of processes. The scheduler 114 supports different processes by reserving a rate for each task. The rate may be expressed as any type of resource allocation for the processor 102. In one embodiment, the rate is expressed as a percentage of CPU processing cycles. In some embodiments, the deadlines, or times at which the indicated resource allocation is expected to equal the corresponding reservation, are also represented. By implementing the scheduler 114 in this manner, all tasks and jobs, including static tasks and jobs, are scheduled according to EDF, or more specifically according to RBED.

In one embodiment, the scheduler 114 implements RBED to support statically scheduled tasks in the following manner. In this example, a static schedule (S) is designed to operate on a CPU (C_1) with a known frequency (F_1). The scheduler (S) schedules a set of jobs (J={j_1, j_2, ..., j_n}) that have critical instants (I={i_2, i_3, ..., i_n}) corresponding to the start times and finish times of the tasks in the static schedule. In other words, job j_1 must finish before time i_1, and job j_2 must start at time i_1 and finish before time i_2.

In order to run the jobs (J) that are originally in the static schedule (S) on a second CPU (C_2) with a frequency (F_2; where F_2 is greater than F_1) that also may be running other tasks scheduled with EDF, having assigned rates and deadlines, additional parameters are generated for the jobs (J). In particular, the jobs (J) can run on the second CPU (C_2) concurrently with other tasks by assigning the task containing jobs (J) the following processing parameters:

$$\text{Rate} = \frac{F\_1}{F\_2}; \text{ and Deadlines} = \{i\_1, i\_2, \ldots, i\_n\}.$$

In one embodiment, the RBED implementation ensures that each task starts and finishes at the appropriate times. This is accomplished by ensuring that the expected resources, exactly equivalent to the resources that would be provided by the first CPU (C_1), are available between any two critical instants i_a and i_b. In other words, the scheduler 114 makes sure that the same or similar processing resources are available for the static jobs as the processing resources that would be available on another processor for which the static schedule is designed.

It should also be noted that although embodiments are described herein with specific reference to RBED, other embodiments may be implemented with another scheduling model based upon EDF, for example cluster based scheduling (CBS) or variable rate execution (VRE).

Figure 3:
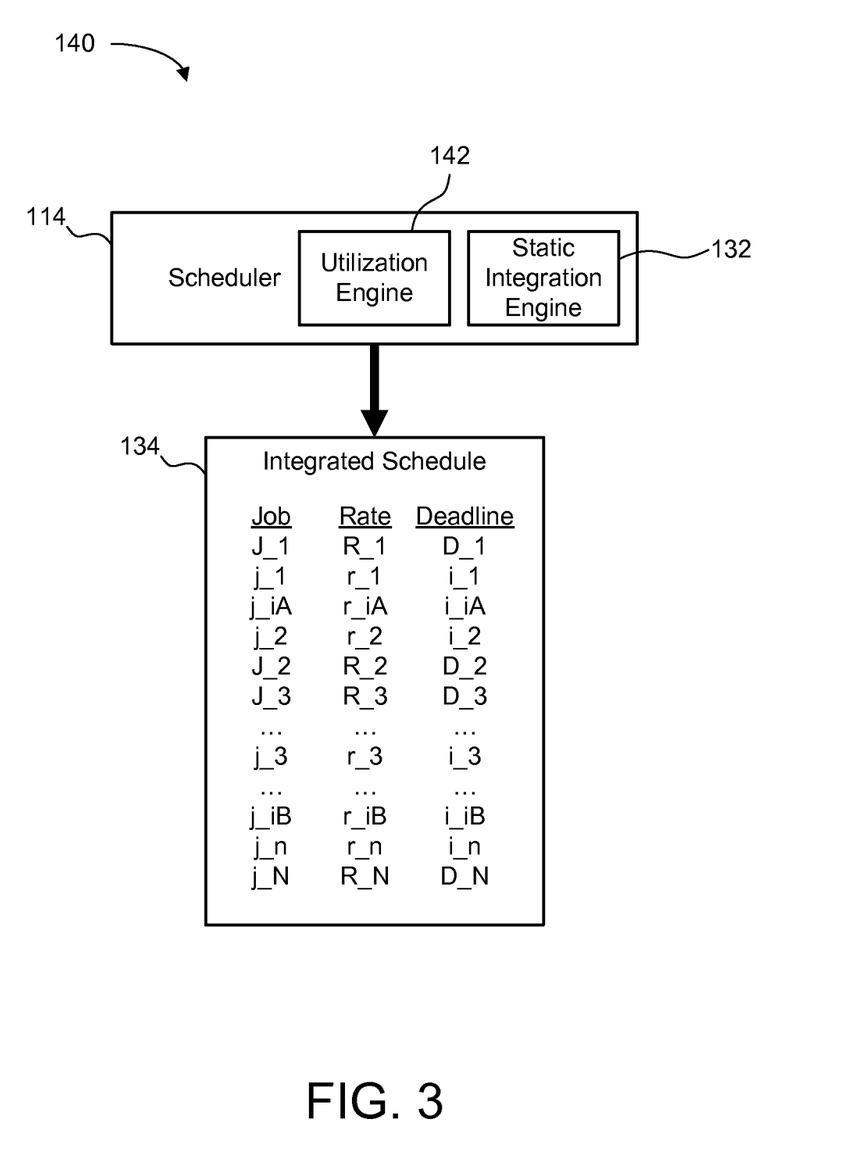
FIG. 3 depicts a schematic diagram of one embodiment of a process for inserting idle jobs into the integrated schedule of FIG. 2.

FIG. 3 depicts a schematic diagram of one embodiment of a process 140 for inserting idle jobs into the integrated schedule of FIG. 2. In some embodiments, it may be useful to obscure the actual execution times of the jobs (J) from the static schedule (S) within the integrated schedule 134. For example, there may be security reasons to prevent or impair detection of the execution times via covert channels based on CPU usage. In one embodiment, idle times within the static schedule (S) can be allocated to idle tasks that consume any unused CPU time.

In the illustrated embodiment, the scheduler 114 includes a utilization engine 142 to identify idle times within the static schedule (S) and to generate idle jobs (designated as j_iA and j_iB) that consume some or all of the unused CPU time. Corresponding deadlines (i_iA and i_iB) (and optionally rates (r_iA and r_iB)) are also generated. Alternatively, some or all of the idle time may be available for allocation to other processes.

Figure 4:
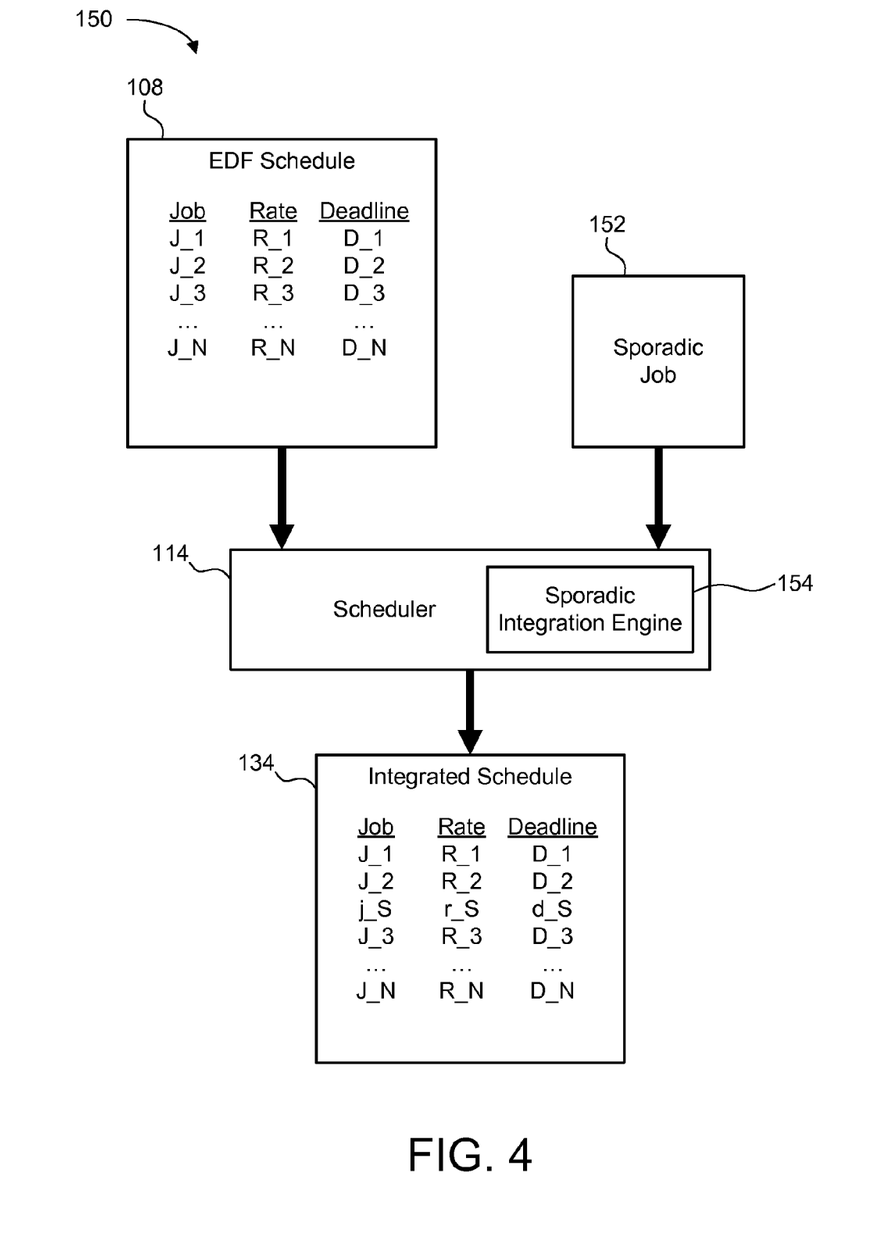
FIG. 4 depicts a schematic diagram of one embodiment of a process for integrating a sporadic job into an EDF schedule.

FIG. 4 depicts a schematic diagram of one embodiment of a process 150 for integrating a sporadic job 152 into an EDF schedule. For reference, certain component parts of the computer system 100 are shown in FIG. 4. However, the flow of data and processing operations depicted in FIG. 4 are not necessarily indicative of a specific physical layout or data coupling of such component parts within the computer system 100.

In some embodiments the sporadic jobs include interrupt service routines or jobs related to other externally generated events.

In the illustrated embodiment, the scheduler 114 includes a sporadic integration engine 154 which integrates the sporadic job 152 with the EDF schedule 108 to generate the integrated schedule 134.

In an embodiment using the RBED scheduler, sporadic jobs may be handled by assigning to the job (designated s_1) a corresponding rate (r_1) and deadline (d_1). The job then may be scheduled along with all other jobs handled by the RBED scheduler.

In the illustrated example of the integrated schedule 134, the sporadic job (designated as j_S) is scheduled between dynamic jobs J_2 and J_3. Also, the scheduler 114 generates a corresponding rate (r_S) and deadline (d_S) for the sporadic job (j_S).

In an RBED embodiment, the rate assigned to a sporadic job must be chosen so that the sum of the assigned rates is less than or equal to 100% of the CPU. In particular, if R is the sum of all of the assigned rates in the system prior to the arrival of the sporadic job, then the sporadic job may be assigned any rate r_S up to r'=100%−R. If the sporadic job should complete as quickly as possible, then it should be assigned the rate r_S=r'.

If a sporadic job has a worst case execution time e_S, then its deadline d_S may be set to its arrival time+e_S*r_S. The rate r_S is considered to be allocated and unavailable until either the deadline or until the arrival time e'_S*r_S, whichever is later, where e'_S is the actual execution time of the job.

If the resulting deadline of the sporadic job is the earliest deadline in the system, the job may begin execution immediately and, as long as no other job enters the system with an earlier deadline, it may safely execute to completion without interfering with the processing of any other job or task. This is useful in the case of interrupt service routines and other urgent but not necessarily compute-intensive sporadic processing.

This functionality can be used in at least two ways. First this type of functionality can be used for determining the feasibility of specific jobs or tasks with fixed scheduling requirements in a system of tasks scheduled with EDF. Second, this type of functionality can be used for determining at run-time when it is safe to allow interrupt service routines (or other asynchronous events) to be executed. As described above, the scheduler 114 may implement RBED or another type of EDF scheduling model.

Figure 5:
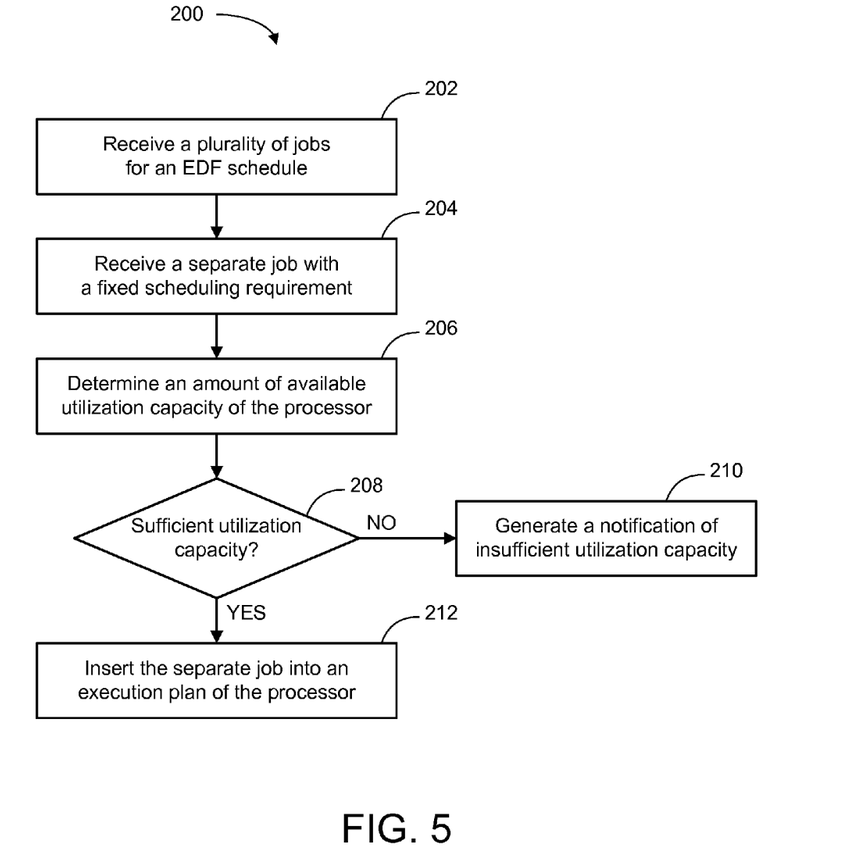
FIG. 5 depicts a flow chart diagram of one embodiment of a method for operating the EDF scheduler for the processor within the computer system of FIG. 1.

FIG. 5 depicts a flow chart diagram of one embodiment of a method for operating the EDF scheduler 114 for the processor 102 within the computer system 100 of FIG. 1. Although the method 200 for determining integration parameters is described in conjunction with the computer system 100 of FIG. 1, other embodiments of the method 200 may be implemented with other types of computer systems.

In the illustrated embodiment, the depicted method 200 includes receiving 202 a plurality of jobs for an earliest deadline first (EDF) schedule. In one embodiment, the EDF scheduler 114 implements an EDF scheduling model using the jobs. The EDF scheduler 114 also receives 204 a separate job that is, in some embodiments, from a source other than the EDF schedule. The separate job has a fixed scheduling requirement with a specific execution time. In some embodiments, the separate job is a short duration sporadic job, and the fixed scheduling requirement is associated with the sporadic job. The EDF scheduler 114 then determines 206 an amount of available utilization capacity of the processor 102. If the EDF scheduler 114 determines 208 that there is insufficient utilization capacity, then the EDF scheduler 114 may generate 210 a notification of the insufficient utilization capacity. Alternatively, the EDF scheduler inserts 212 the separate job into an execution plan of the processor 102 with the plurality of jobs from the EDF schedule 108 in response to a determination 208 that the available utilization capacity of the processor 102 is sufficient to execute the separate job according to the fixed scheduling requirement associated with the separate job. The depicted method 200 then ends.

It should also be noted that at least some of the operations for the methods may be implemented using software instructions stored on a computer useable storage medium for execution by a computer. As an example, an embodiment of a computer program product for inserting jobs into a scheduler, which implements an EDF scheduling protocol, of a processor includes a computer useable storage medium to store a computer readable program that, when executed on a computer, causes the computer to perform operations. In one embodiment, the operations include receiving a plurality of jobs from an earliest deadline first (EDF) schedule. The operations also include receiving a separate job from a source other than the EDF schedule. The separate job has a fixed scheduling requirement. The operations also include determining an amount of available utilization capacity of the processor. The operations also include inserting the separate job into an execution plan of the processor in response to a determination that the available utilization capacity of the processor is sufficient to execute the separate job according to the fixed scheduling requirement associated with the separate job.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution system, apparatus, or device.

The computer-useable or computer-readable storage medium can be an electronic, magnetic, optical, electromagnetic, infrared, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for implementation within a scheduler for a processor, the method comprising:
   receiving a plurality of jobs from an earliest deadline first (EDF) schedule, wherein the scheduler implements an EDF scheduling model;
   receiving a separate job from a source other than the EDF schedule, wherein the separate job has a fixed scheduling requirement with a specific execution time;
   determining an amount of available utilization capacity of the processor;
   inserting the separate job into an execution plan of the processor with the plurality of jobs from the EDF schedule in response to a determination that the available utilization capacity of the processor is sufficient to execute the separate job according to the fixed scheduling requirement associated with the separate job, wherein the separate job comprises a static job from a static schedule, and the static job is natively scheduled for implementation according to a static scheduling model;
   obtaining a critical instant for the static job from the static schedule, wherein the critical instant indicates the specific execution time requirement of the static job;
   assigning a deadline to the static job within the execution plan, wherein the deadline is based on the critical instant of the static job; and
   reserving a rate for the separate job, wherein the rate comprises a utilization factor indicative of an amount of the available utilization capacity of the processor that is allocated to the separate job, wherein the rate is calculated according to the following ratio:

$$\text{Rate} = \frac{F\_1}{F\_2},$$

in which $F\_2$ represents an operating frequency of the processor on which the static job executes, and $F\_1$ represents an operating frequency of another processor on which the static job is designed to execute.

2. The method of claim 1, wherein the separate job comprises a short duration sporadic job, wherein the sporadic job is assigned an earliest deadline, is allowed to execute to completion, and affects the EDF schedule, and the method further comprises integrating the sporadic job into the execution plan with the plurality of jobs from the EDF schedule.

3. A computer program product comprising:
a non-transitory computer readable storage medium to store a computer readable program, wherein the computer readable program, when executed on a computer, causes the computer to perform operations for inserting jobs into a scheduler of a processor, the operations comprising:
receiving a plurality of jobs from an earliest deadline first (EDF) schedule, wherein the scheduler implements an EDF scheduling model;
receiving a separate job from a source other than the EDF schedule, wherein the separate job has a fixed scheduling requirement;
determining an amount of available utilization capacity of the processor;
inserting the separate job into an execution plan of the processor in response to a determination that the available utilization capacity of the processor is sufficient to execute the separate job according to the fixed scheduling requirement associated with the separate job, wherein the separate job comprises a static job from a static schedule, wherein the static job is natively scheduled for implementation according to a static scheduling model;
obtaining a critical instant for the static job from the static schedule, wherein the critical instant indicates a specific execution time requirement of the static job;
assigning a deadline to the static job within the execution plan, wherein the deadline is based on the critical instant of the static job;
reserving a rate for the separate job wherein the rate comprises a utilization factor indicative of an amount of the available utilization capacity of the processor that is allocated to the separate job; and
calculating the rate for the static job according to the following ratio:

$$\text{Rate} = \frac{F\_1}{F\_2},$$

in which $F\_2$ represents an operating frequency of the processor on which the static job executes, and $F\_1$ represents an operating frequency of another processor on which the static job is designed to execute.

4. The computer program product of claim 3, wherein the fixed scheduling requirement comprises a specific execution time for the separate job.

5. The computer program product of claim 3, wherein the operations further comprise reserving resources on the processor that are substantially equivalent to resources designed to be available for execution of the static job on the other processor.

6. The computer program product of claim 3, wherein the operations further comprise scheduling the static job for execution on the processor concurrently with other jobs from the EDF schedule.

7. The computer program product of claim 3, wherein the operations further comprise scheduling an idle task at a time corresponding to an unscheduled time within the static schedule, wherein the idle task is configured to consume an unused processor resource.

8. The computer program product of claim 3, wherein the separate job comprises a short duration sporadic job, wherein the sporadic job is assigned an earliest deadline, is allowed to execute to completion, and affects the EDF schedule.

9. The computer program product of claim 3, wherein the separate job comprises a short duration sporadic job, wherein the sporadic job comprises an interrupt service routine.

10. The computer program product of claim 3, wherein the separate job comprises a short duration sporadic job, wherein the sporadic job comprises a specific execution time requirement.

11. A system comprising:
a processor configured to execute instructions related to a plurality of jobs; and
a scheduler coupled to the processor, wherein the scheduler is configured to implement an earliest deadline first (EDF) scheduling model, and the scheduler is further configured to:
receive a plurality of jobs from an EDF schedule;
receive a separate job from a source other than the EDF schedule, wherein the separate job has a fixed scheduling requirement;
insert the separate job into an execution plan of the processor in response to a determination that an available utilization capacity of the processor is sufficient to execute the separate job according to the fixed scheduling requirement associated with the separate job, wherein the separate job comprises a static job from a static schedule, wherein the static job is natively scheduled for implementation at a specific execution time according to a static scheduling model, and the scheduler further comprises a static integration engine to integrate the static job into the execution plan with the plurality of jobs from the EDF schedule;
obtain a critical instant for the static job from the static schedule, wherein the critical instant indicates the specific execution time requirement of the static job;
assign a deadline to the static job within the execution plan, wherein the deadline is based on the critical instant of the static job;
reserve a rate for the separate job, wherein the rate comprises a utilization factor indicative of an amount of the available utilization capacity of the processor that is allocated to the separate job; and
calculate the rate for the static job according to the following ratio:

$$\text{Rate} = \frac{F\_1}{F\_2},$$

in which $F\_2$ represents an operating frequency of the processor on which the static job executes, and $F\_1$ represents an operating frequency of another processor on which the static job is designed to execute.

12. The system of claim 11, wherein the scheduler further comprises a utilization engine to schedule an idle task at a time corresponding to an unscheduled time within the static schedule, wherein the idle task is configured to consume an unused processor resource.

13. The system of claim 11, wherein the separate job comprises a short duration sporadic job, wherein the sporadic job is assigned an earliest deadline, is allowed to execute to completion, and affects the EDF schedule, and the scheduler further comprises a sporadic integration engine to integrate the sporadic job into the execution plan with the plurality of jobs from the EDF schedule.

* * * * *